United States Patent
Sinha et al.

(10) Patent No.: US 11,040,669 B2
(45) Date of Patent: Jun. 22, 2021

(54) MOUNTING STRUCTURE TO ATTACH VEHICLE ACCESSORIES

(71) Applicant: Ford Global Technologies, LLC, Dearborn, MI (US)

(72) Inventors: Stuti Sinha, Novi, MI (US); Scott Culver Anderson, Commerce Township, MI (US); Aaron Halonen, Brighton, MI (US); Daniel Jammoul, Plymouth, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 16/597,166

(22) Filed: Oct. 9, 2019

(65) Prior Publication Data
US 2021/0107411 A1   Apr. 15, 2021

(51) Int. Cl.
*B60R 11/00* (2006.01)
*B60R 16/023* (2006.01)
*B60N 3/10* (2006.01)

(52) U.S. Cl.
CPC ............ *B60R 11/00* (2013.01); *B60R 16/023* (2013.01); *B60N 3/10* (2013.01); *B60R 2011/0003* (2013.01); *B60R 2011/0084* (2013.01)

(58) Field of Classification Search
CPC ............... B60R 11/00; B60R 16/023; B60R 2011/0084; B60R 2011/0003; B60N 3/10
USPC ..................................................... 248/225.11
See application file for complete search history.

(56) References Cited

U.S. PATENT DOCUMENTS

| 4,936,533 A | 6/1990 | Adams et al. |
| 5,086,958 A | 2/1992 | Nagy |
| 5,961,083 A | 10/1999 | Hartmann et al. |
| 7,916,009 B2 | 3/2011 | Schofield et al. |
| 8,020,821 B2 * | 9/2011 | Chen ................ G06F 1/18 248/220.22 |
| 2007/0297075 A1 | 12/2007 | Schofield et al. |
| 2008/0169667 A1 * | 7/2008 | Siniarski ............ B60R 11/00 296/37.8 |
| 2019/0291606 A1 * | 9/2019 | Hodgson ............. B60N 3/001 |
| 2020/0291674 A1 * | 9/2020 | Olivieri ............ E05B 13/001 |
| 2021/0107411 A1 * | 4/2021 | Sinha ................ B60R 16/023 |

* cited by examiner

*Primary Examiner* — Muhammad Ijaz
(74) *Attorney, Agent, or Firm* — David Coppiellie; Price Heneveld LLP

(57) ABSTRACT

A mounting structure for a vehicle accessory comprises a panel including a surface defining a channel with a wall disposed between two sides extending from the surface in a direction toward an interior of the vehicle, the wall defining a ledge, and a tab, attached with the vehicle accessory, that mates with the channel, the tab being confined by the sides and the ledge between the surface and the wall such that the vehicle accessory is slideably and removably attached to the panel.

17 Claims, 5 Drawing Sheets

MOUNTING STRUCTURE TO ATTACH VEHICLE ACCESSORIES

FIELD OF THE DISCLOSURE

The present disclosure generally relates to storage systems for an interior area of a vehicle.

BACKGROUND OF THE DISCLOSURE

Vehicles generally use storage systems to store and secure various items having varying sizes. Vehicle storage systems may be disposed within an interior area and included in center console units, trim panels, seats as well as floors. Typically, storage systems may be designed to organize, store, or contain certain, specified items. For example, a center console may include a coin storage system that organizes and arranges spare change of the user based on coin type and size. These storage systems are designed to secure the specified items in an organized manner to protect the specified items during travel or use of the vehicle. Therefore, these storage systems may be inefficiently used when traveling with a different array of items that the storage systems have not been specifically designed to secure.

SUMMARY OF THE DISCLOSURE

According to a first aspect of the present disclosure, a mounting structure for a vehicle accessory comprises a panel including a surface defining a channel with a wall disposed between two sides extending from the surface in a direction toward an interior of the vehicle. The wall defines a ledge. A tab, attached with the vehicle accessory, mates with the channel. The tab is confined by the sides and the ledge between the surface and the wall such that the vehicle accessory is slideably and removably attached to the panel.

Embodiments of the first aspect of the disclosure can include any one or a combination of the following features:
the wall defines first and second diameters along a length of the channel, the first diameter being greater than the second diameter;
the wall defines the first and second diameters in a tapered orientation such that the ledge defines an apex to hold a cantilever arm of the tab;
the tab defines a thickness that decreases from a first end to a second end of the tab;
the surface further defines a recessed bore defined at an angle toward a floor of the vehicle such that light from an ambient light engine projects through the bore;
the mounting structure further comprises electrical pads molded on the surface and within the channel to interconnect the vehicle accessory and a vehicle control sub-system; and
the mounting structure further comprises a port formed in the channel beneath the ledge on a bottom surface of the channel.

According to a second aspect of the present disclosure, a storage system for an interior of a vehicle comprises a mounting structure for a vehicle panel. The mounting structure includes a channel defined on the panel having a wall disposed between two sides extending from the surface in a direction toward an interior of the vehicle, the wall defining a ledge. An accessory having a tab mates with the channel. The tab is confined by the sides and the ledge between the surface and the wall such that the accessory is slidably and removably disposed within the channel.

Embodiments of the second aspect of the disclosure can include any one or a combination of the following features:
the tab includes a cantilever arm that interconnects the accessory and the tab, the cantilever arm being slidable within the channel;
the wall defines first and second diameters along a length of the channel, the first diameter being greater than the second diameter;
the wall defines the first and second diameters in a tapered orientation such that the ledge defines an apex to retain a cantilever arm of the tab;
the surface further defines a recessed bore defined at an angle toward a floor of the vehicle such that light from an ambient light engine projects through the bore;
electrical pads are molded on the surface and within the channel to interconnect the vehicle accessory and a vehicle control sub-system; and
a port formed in the channel beneath the ledge on a bottom surface of the channel.

According to a third aspect of the present disclosure, a vehicle comprises a panel disposed in an interior area of the vehicle. The panel defines a channel having a wall disposed between two sides extending from the surface in a direction toward an interior of the vehicle, the wall defining a ledge. An accessory is removably attached to the panel via a tab that mates with the channel. The tab is confined by the sides and the ledge between the surface and the wall such that the tab is slidably received within the channel.

Embodiments of the third aspect of the disclosure can include any one or a combination of the following features:
the tab includes a cantilever arm that interconnects the accessory and the tab, the cantilever arm being slidable within the channel;
the wall defines first and second diameters in a tapered orientation such that the ledge defines an apex to retain the cantilever arm of the tab;
the surface further defines a recessed bore defined at an angle toward a floor of the vehicle such that light from an ambient light engine projects through the bore;
electrical pads molded on the surface and within the channel to interconnect the vehicle accessory and a vehicle control sub-system; and
a port formed in the channel beneath the ledge on a bottom surface of the channel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
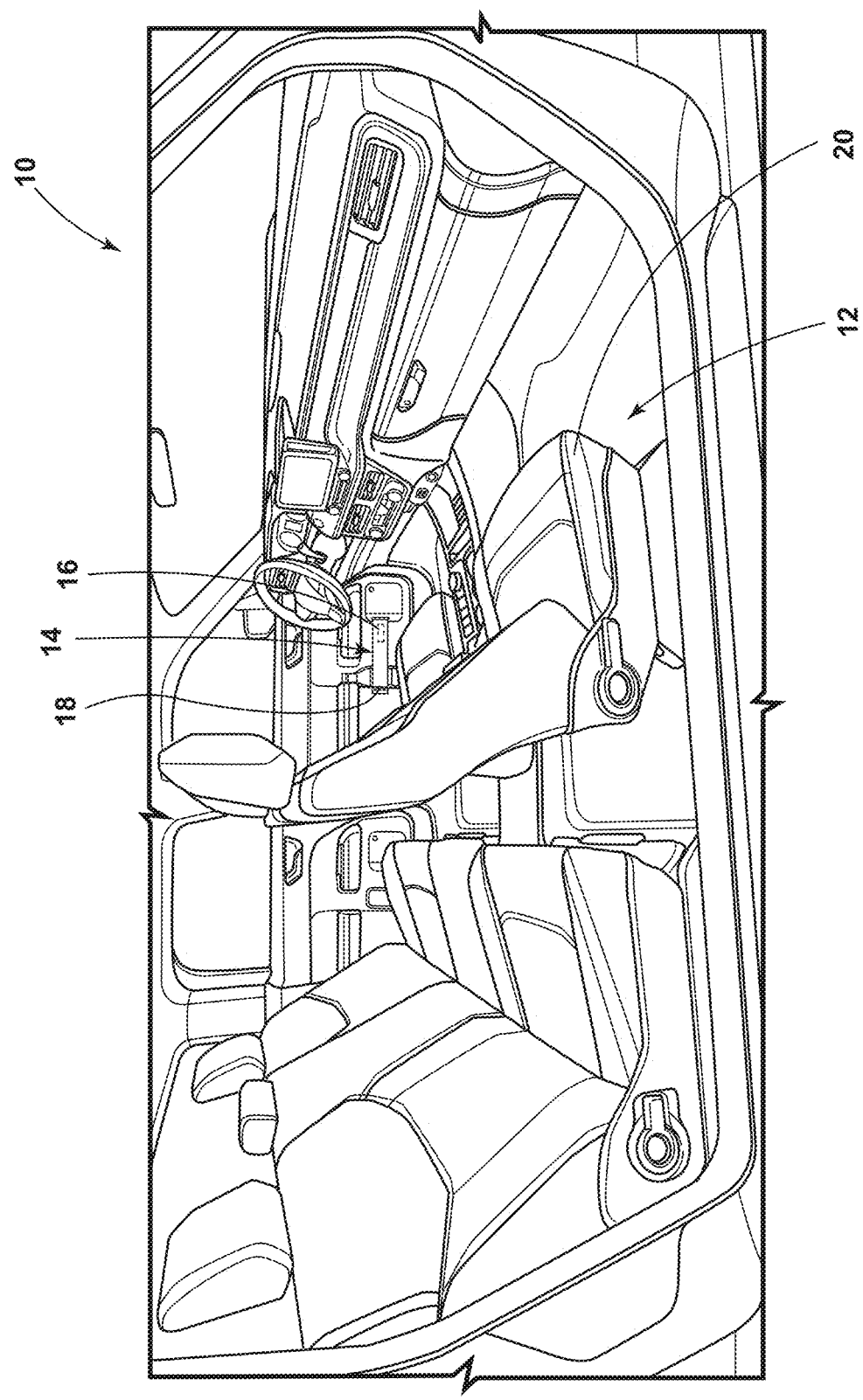
FIG. 1 is a side, perspective view of an interior area of a vehicle.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring to FIG. 1, a side perspective view of a vehicle 10 is depicted. The vehicle 10 defines an interior area 12. The interior area 12 includes a storage system 14. The storage system 14 may be disposed on, or attached to, a panel 18 in the interior area 12 of the vehicle 10. As will be described in more detail below, the storage system 14 may include a mounting structure 16 that attaches the storage system 14 to the panel 18 in the interior area 12 of the vehicle. The mounting structure 16 may be configured to be releasably and removably attached to the panel 18. A user (not shown) may use the storage system 14 for variety of different purposes, and remove the mounting structure 16 based on each of the uses. For example, as depicted in FIG. 1, the mounting structure 16 may include a cupholder being attached to the panel 18. If the user desires different storage options for the storage system 14, such as, but not limited to, a map container, a spare change container, or an accessory storage system, instead of the cupholder, the mounting structure 16 of the storage system 14 may be removed from the panel 18 and replaced with a mounting structure 16 specific for the intended use of the storage system 14. This allows the storage system 14 within the interior area 12 of the vehicle 10 to be customizable, or personalized based on an intended use of the vehicle 10.

Vehicles typically have dedicated storage systems 14 disposed within the interior area 12 of the vehicle 10. Currently, many storage systems 14 require a large amount of packaging space, increase mass of the vehicle 10, are expensive to make, and do not offer flexibility or customization for the owner. The storage system 14 of the present disclosure provides advantages to allow a user flexibility when using the storage system 14 to transport items in the vehicle 10. The ability to remove and release the mounting structure 16 allows the user to customize and personalize the storage system 14 while decreasing a number of components (not shown), which reduces the overall mass of the vehicle 10 needed to secure the storage system 14 to the panel 18 in the interior area 12.

As depicted in FIGS. 1-3, the panel 18 is depicted as a door panel, in which the storage system 14 is attached to the panel 18 through the mounting structure 16. This is merely exemplary. The panel 18 may be any panel 18 disposed within the interior area 12 of the vehicle 10. For example, the panel 18 may also include an instrument panel, a dash panel, a console unit, a floor, and seats and seat bases. As will be described in more detail below, the vehicle 10 may include a plurality of storage systems 14 disposed across a variety of panels 18 within the interior area 12 of the vehicle 10. Increasing a number of available storage systems 14 within the vehicle 10 increases an amount of customization that is possible for the interior area 12 of the vehicle 10. For example, having more than one storage system 14 disposed within the interior area 10 of the vehicle 10 provides a user more than one option, which can be selected based on preference, such as, but not limited to, storage systems 14 specific for camping trips. Again, the storage systems 14 allow for customization of the interior area 12 through the mounting structure 16 that interchanges the panel 18 and an accessory 20. The mounting structure 16 may be directly attached, via molding, forming, or by design, or indirectly attached, via fasteners and brackets, to the accessory 20. Attaching mounting structure 16 to the accessory 20 allows the storage system 14 to be removable from the panel 18. Additionally, the mounting structure 16 may be interchangeable across accessories 20 such that each storage system 14 attached to any panel 18 may be chosen and arranged based on preference of the user.

Figure 2A:
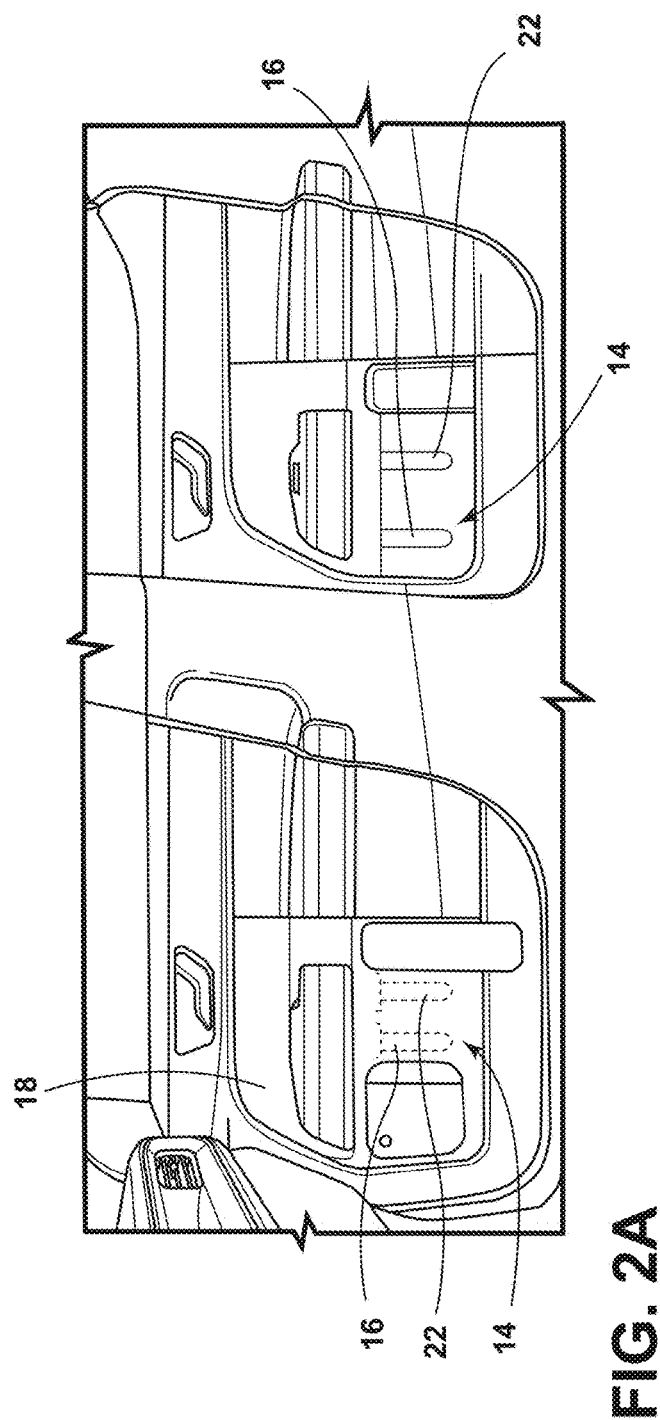
FIGS. 2A and 2B are a side views of a door panel having a storage system attached to the door panel.
Figure 2B:
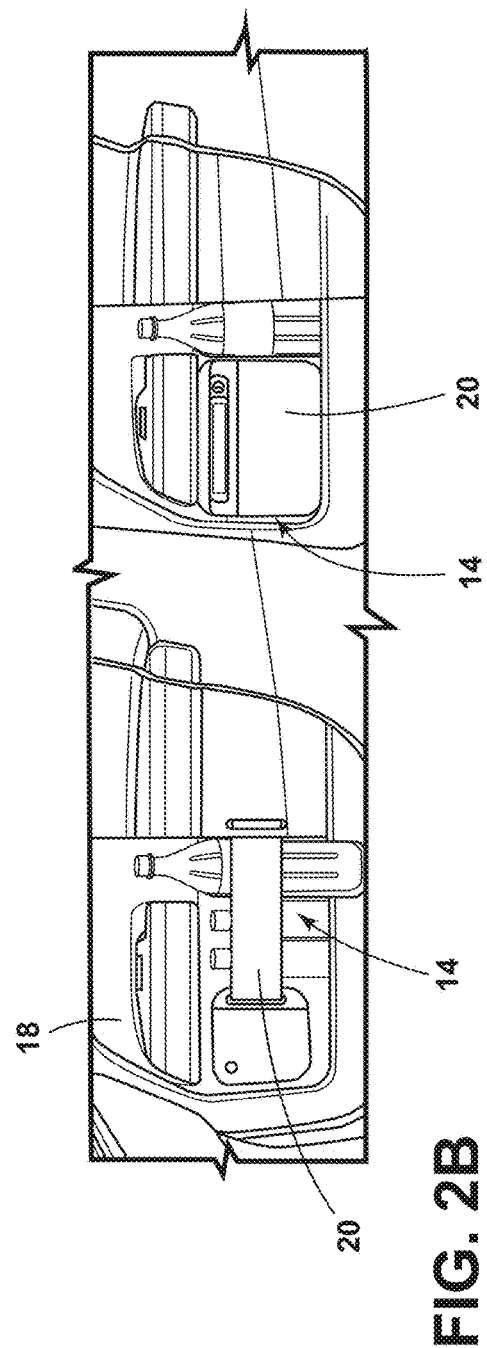

FIGS. 2A and 2B further depict customization of the panel 18 using the storage system 14 and mounting structure 16. FIGS. 2A and 2B depict a storage system 14 attached with a front door panel, as well as a rear door panel. The storage systems 14 may vary depending on a packaging space of the interior area 12 of the vehicle 10. For example, the front and rear door panels may have different storage systems 14 depending on an available packaging space in the interior area 12 around the front and rear door panels. FIG. 2A depicts the front and rear door panels without the accessory 20 attached to either of the front and rear door panels. FIG. 2B depicts the front door panel having a strap accessory 20 attached with the front door panel and a bag accessory 20 attached with the rear door panel. The panel 18 may define a channel 22 that slidably receives the accessory 20 to interconnect the panel 18 and accessory 20. The channel 22 may be defined on the panel 18 based on an allowable packaging space in the interior area 12 of the vehicle 10. The channel 22 may be uniform to allow for interchangeability between storage systems 14.

Figure 3B:
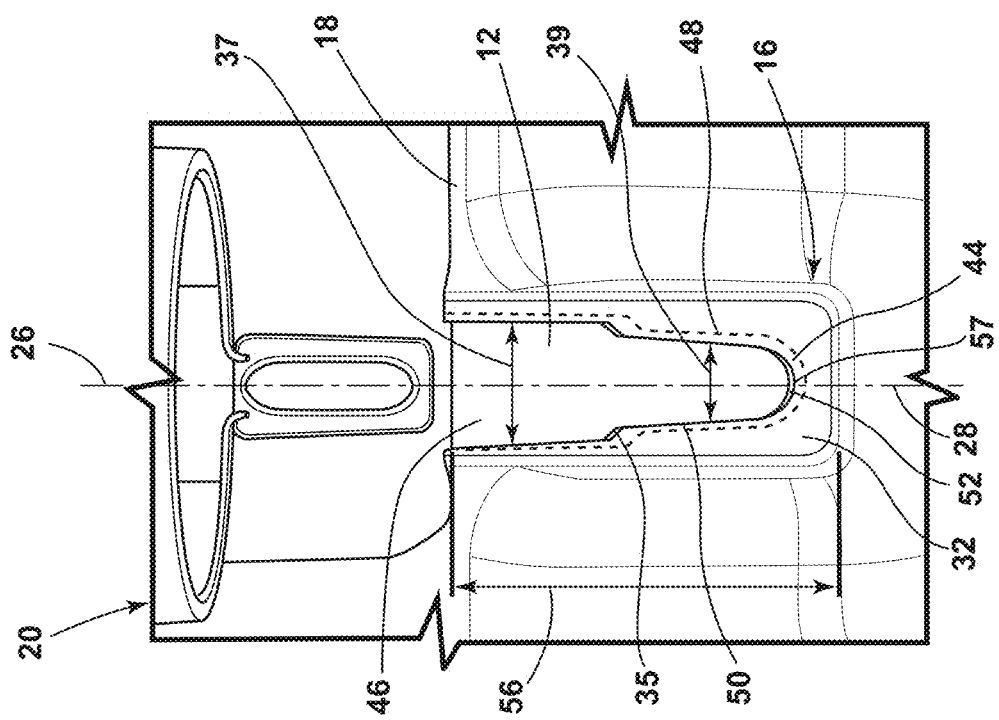
FIGS. 3A and 3B are side and front perspective views, respectively, of the storage system having a mounting structure.
Figure 3A:
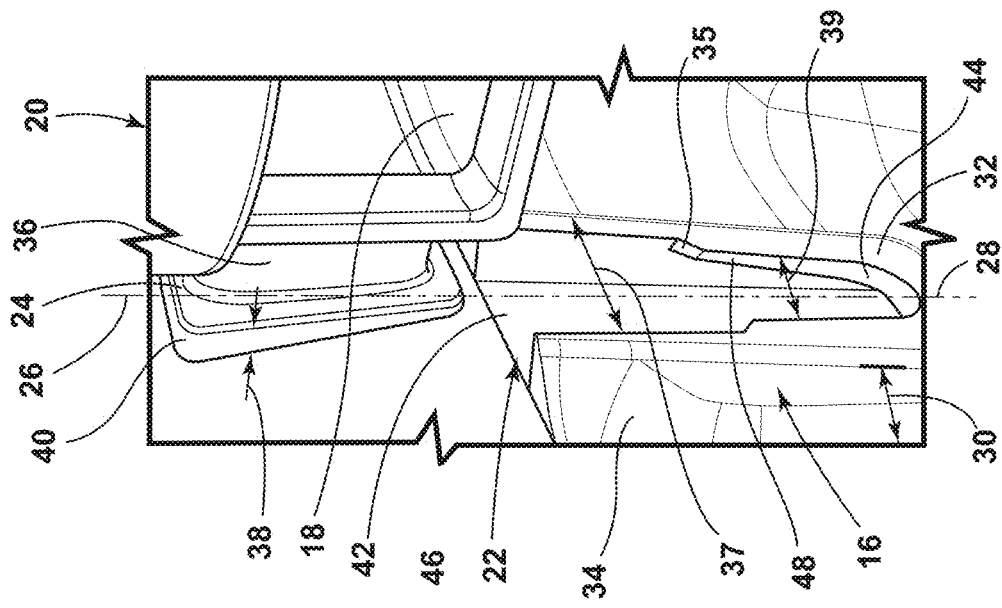

FIGS. 3A and 3B depicts side and front perspective views of the mounting structure 16 and the channel 22 defined in the panel 18 to attach the accessory 22 to the panel 18. Specifically, FIG. 3A depicts a side perspective view showing a tab 24 aligned with the channel 22 of the mounting structure 16. Likewise, FIG. 3B depicts a front view of the tab 24 aligned with the channel 22, in which the tab 24 interconnects the mounting structure 16 of the panel 18 and the accessory 20. Stated differently, the tab 24 defines a centerline 26 aligned with a center 28 of the channel 22 to secure the accessory 20 on the panel 18 via the mounting structure 16 interconnecting the panel 18 and the accessory 20. As depicted in FIG. 3B, the accessory 20 may be a cupholder being slidably received in the channel 22 and secured in the channel 22 via the tab 24.

As can be seen specifically in FIG. 3A, the channel 22 is defined at a distance 30 from the panel 18 to receive the tab 24. Stated differently, the channel 22 defines a wall 32 disposed between at least two sides 34, in which the two sides 34 extend in a direction toward the interior area 12 of the vehicle 10 to the distance 30. Therefore, the distance 30 defines the depth of the channel 22 that receives the tab 24 to interconnect the panel 18 and the accessory 20. The tab 24 is slidably received in the channel 22 formed in the mounting structure 16. The tab 24 is confined by the sides 34 and the wall 32. The tab 24 includes a cantilever arm 36 that interconnects the accessory 20 and the tab 24 to attach the accessory 20 to the panel 18 using the mounting structure 16. The cantilever arm 36 is slidable within the channel 22 along the centerline 26. Also, as will be described in more detail below, the wall 32 may further define a beveled edge 35. The beveled edge 35 may be formed on the wall 32 to allow the channel 22 to define first and second diameters 37, 39. Having differing, first and second diameters 37, 39 allows the cantilever arm 36 to accurately slide within the channel 22 and be supported between the two sides 34 of the channel 22.

Further, as can be seen in FIG. 3A, the tab 24 defines a thickness 38 that decreases from a first end 40 to a second end 42 of the tab 24. Stated differently, the tab 24 defines a tapered thickness 38 that decreases from the first end 40 to the second end 42. The tapered thickness 38 defined by the tab 24 further allows the tab 24 to be slidably received in the channel 22 to secure the cantilever arm 36 within the channel 22. To secure the cantilever arm 36, the mounting structure 16 further includes a ledge 44 defined on the wall 32 at the center 28. Stated differently, the ledge 44 is defined on the wall 32 such that the cantilever arm 36 rests on the ledge 44 and the tab 24 abuts a surface 46 of the channel 22. The tab 24 abuts the surface 46 of the panel 18 to rigidly secure the accessory 20 in the mounting structure 16 defined on the panel 18. The tab 24 presses against the surface 46 at the first end 40 such that the second end 42 is secured against an inner surface 48 of the wall 32. Therefore, to remove the accessory 20 from the mounting structure 16, the second end 42 of the tab 24 is angled toward the surface 46 of the panel 18 to slide the cantilever arm 36 and first end 40 of the tab along the centerline 28 away from the ledge 44.

FIG. 3B depicts a front view of the wall 32, the channel 22 and the tab 24 of the accessory 20. Specifically, FIG. 3B depicts a contour 50 defined on the wall 32, which allows the cantilever arm 36 to slide within the channel 22 and rest on the ledge 44 of the wall 32. As shown in FIG. 3B, the ledge 44 is shown having a semicircular contour 52. The ledge contour 52 may be defined having any shape, or design that matches a shape or design of the cantilever arm 36. Matching a shape or design of the ledge contour 52 to the cantilever arm 36 allows the ledge 44 to adequately support the tab 24 in the channel 22 such that the panel 18 supports the accessory 20. Again, the beveled edge 35 is depicted as separating the first diameter 37 from the second diameter 39. Again, the beveled edge 35 that defines the first and second diameters 37, 39 in the wall 32 allows the tab 24 to slide within the channel 22 such that the cantilever arm 36 is aligned with the ledge 44 to support the accessory 20 on the panel 18. The cantilever arm 36 is aligned with the ledge 44 if the centerline 26 of the tab 24 intersects the center 28 of the channel 22.

As shown in FIG. 3B, the channel 22 defines the first and second diameters 37, 39 along a length 56 of the channel 22. The first diameter 37 may be greater than the second diameter 39. The first diameter 37 being greater than the second diameter 39 allows for easy installation of the accessory 20 on the panel 18. For example, the centerline 26 of the tab 24 may gradually align with the center 28 of the channel 22 as the cantilever arm 36 slides toward the ledge 44 as the first diameter 37 decreases toward the second diameter 39 to provide clearance allowing for greater customization of accessories 20 on the panel 18. Again, the beveled edge 35 separates the first diameter 37 from the second diameter 39. In at least one embodiment, the first and second diameters 37, 39 may define a tapered orientation. Stated differently, the contour 50 defined on the wall 32 gets narrower toward the ledge 44. Specifically, the contour 50 of the wall 32 defines the first and second diameters 37, 39 in a tapered orientation such that the ledge 44 defines an apex 57 that retains the cantilever arm 36 of the tab 24. The apex 57 retains the cantilever arm 36 such that the centerline 26 of the tab 24 is aligned with the center 28 of the channel 22 via the ledge contour 52 matching the shape of the cantilever arm 36. The contour 50 of the wall 32 that defines the first and second diameters 37, 39 provides easy adaptation between accessories 20 as well as robust retention of the tab 24 in the channel 22 to secure the accessory 20 on the panel 18.

Figure 4:
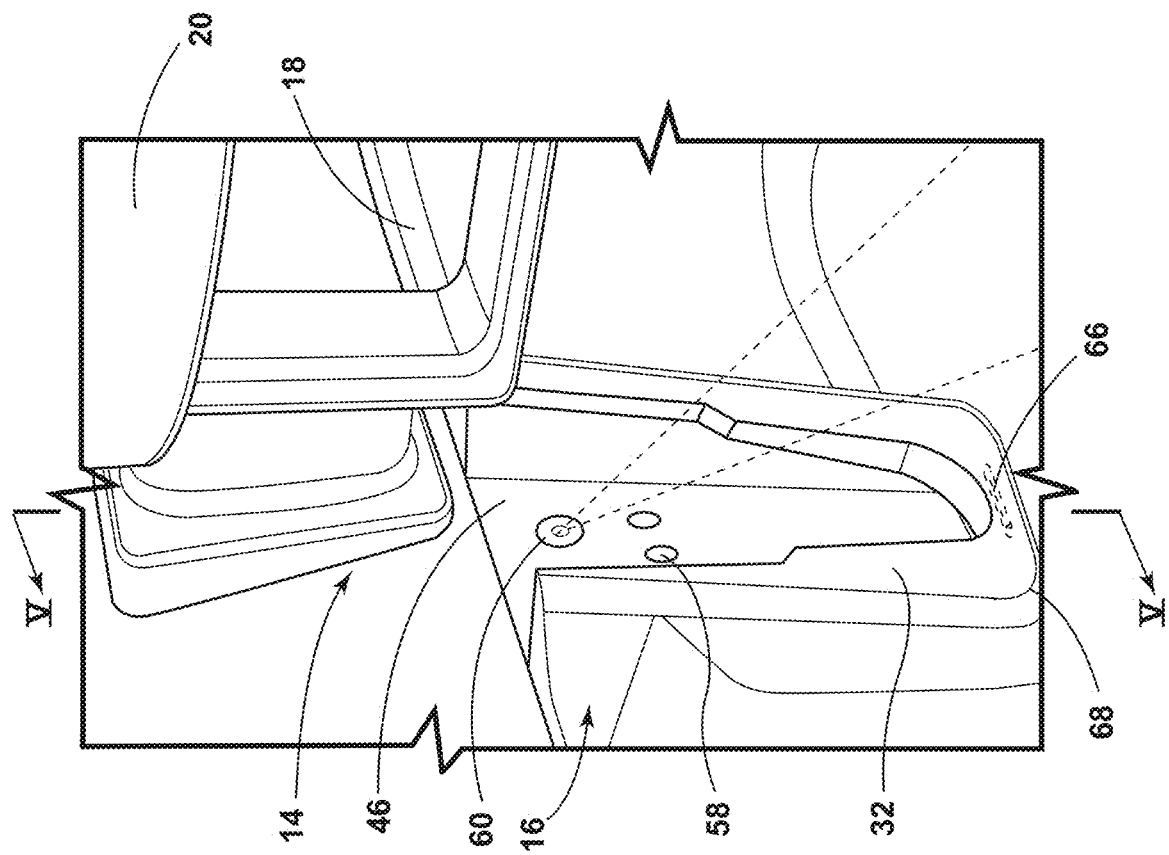
FIG. 4 is a side, perspective view of the mounting structure for the storage system according to a further embodiment.

FIG. 4 depicts a side perspective view of a further embodiment of the storage system 14. Specifically, FIG. 4 depicts the mounting structure 16 as further including electrical pads 58 that provide an electrical connection between the accessory 20 and the panel 18 and a recessed bore 60 defined on the surface 46 of the channel 22 that emits light from a light engine (not shown) to illuminate the channel 22. Illumination of the channel 22 via the light engine (not shown) emitting light through the recessed bore 60 further provides ease when attaching accessories 22 to the panel 18 through the mounting structure 16. For example, emitting light through the recessed bore 60 in the channel 22 provides a visual indication of the location of the mounting structure 16 to remove and secure accessories 20 to the panel 18 using the tab 24 and channel 22, described previously. As will be described in more detail below, the recessed bore 60 may be defined at an angle 61 directed toward a floor 63 of the interior area 12 to provide further illumination of the interior area 12.

As will be described with reference to FIG. 5, the electrical pads 58 may be molded on the surface 46 of the channel 22. The electrical pads 58 may define electrical terminals that provide electrical communication between the accessory 20 and a vehicle component 65, or a vehicle subsystem 66 through the panel 18. For example, the vehicle component 65 may be a battery that charges the accessory 20 attached to the panel 18 via the mounting structure 16. Likewise, the electrical pads 62 may interconnect the vehicle control subsystem 64 and the accessory 20 such that the accessory 20 may transmit or receive preference data, usage data, and sensor data to and from the vehicle control subsystem 64. This further allows for customization and personalization of the storage system 14 using the mounting structure 16.

Figure 5:
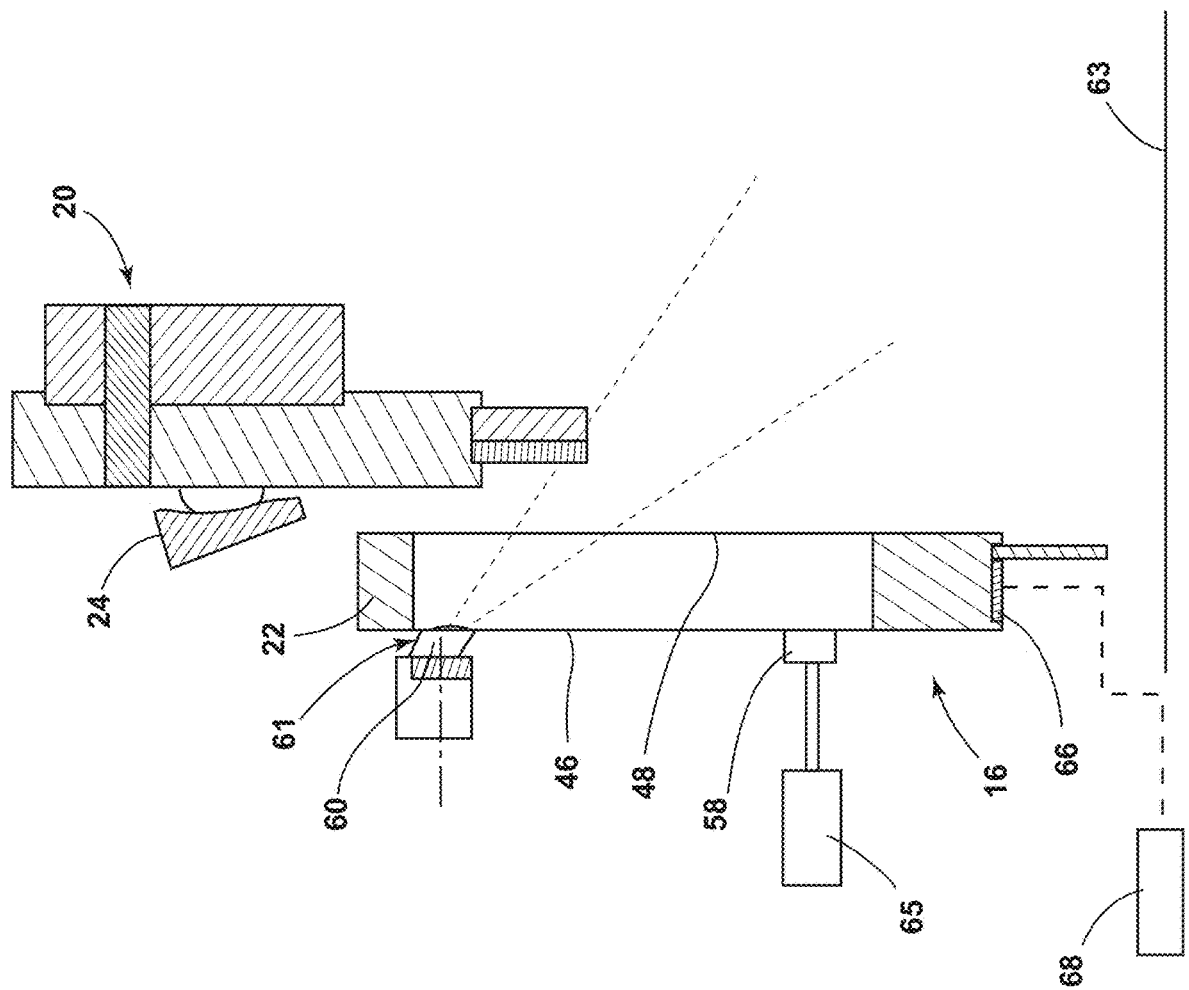
FIG. 5 is a cross-sectional view taken along lines V-V in FIG. 4 of the embodiment depicted in FIG. 4.

FIG. 5 depicts a cross-sectional view of the embodiment depicted in FIG. 4 taken along the lines V-V shown in FIG. 4. Specifically, FIG. 5 depicts the channel 22 between the surface 46 and the inner surface 48 of the wall 32. The accessory 20 is shown exploded from the channel 22, in which the recessed bore 60 defines the angle 61 toward the floor 63. Again, by providing the recessed bore 60 at the angle 61 toward the floor 63, light from a light engine (not shown) further aids to illuminate the mounting structure 16 to more simply slide and release the tab 24 from the channel 22 and interchange accessories 20 with the panel 18 through the mounting structure 16. Likewise, the electrical pads 58 are depicted as extending through the mounting structure 16 and panel 18. Again, the electrical pads 58 provide terminals to interconnect the accessory 20 with a vehicle component 65, such as a battery used to charge the accessory 20. As depicted in FIG. 5, the channel 22 may further define a port 66 on a bottom surface 68 of the channel 22. The port 66 may, for example, be a multimedia, file-storage, or communication port, or any port that transfers data via electrical signals from the accessory 20 to the vehicle control subsystems 64.

Similar to the electrical pads 62, the port 66 may provide communication between the vehicle control subsystems 64 and the accessory 20. For example, the port 66 may provide data transfer through, such as, but not limited to, a Universal Serial Bus ("USB") to the vehicle control subsystems 64 to optimize vehicle usage. The port 66 may provide further optimization of vehicle usage by providing schedule data, weather and location data, and map data to the vehicle control subsystems 64 to optimize control of the vehicle 10 throughout a day. The port 66 may effectuate data transfer between the accessory 20 and the vehicle control subsystems 64 separately from, or simultaneously with, the electrical pads 62. For example, the electrical pads 62 may interconnect the accessory 20 and the vehicle component 65 to charge a battery of the accessory 20 using the vehicle battery (not shown) while the port 66 effectuates transfer of planned vehicle usage data, such as, but not limited to, map data, weather data, terrain data, and schedule data from the accessory 20 to the vehicle control subsystems 64 to optimize vehicle usage in a predetermined, or set amount of time of planned usage of the vehicle.

Optimization between vehicle control subsystems 64 and the accessory 20 using the port 66 provides further customization of the vehicle 10. For example, a user may attach the accessory 22 to the panel 18 via the mounting structure 16 such that a universal serial bus is received in the port 66 transferring planned vehicle usage data to initiate a one-time, frequent, or pre-planned trip without user intervention. Therefore, the storage system 14 of the present disclosure provides further customization of vehicle usage, as well as personalization of the interior area 12 of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mounting structure for a vehicle accessory on a vehicle, the mounting structure comprising:
   a panel including a surface defining a channel with a wall disposed between two sides extending from the surface in a direction toward an interior of the vehicle, the wall defining a ledge; and
   a tab, attached with the vehicle accessory, that mates with the channel, the tab being confined by the sides and the ledge between the surface and the wall such that the vehicle accessory is slideably and removably attached to the panel, wherein the tab defines thickness that decreases from a first end to a second end of the tab.

2. The mounting structure of claim 1, wherein the wall defines first and second diameters along a length of the channel, the first diameter being greater than the second diameter.

3. The mounting structure of claim 2, wherein the wall defines the first and second diameters in a tapered orientation such that the ledge defines an apex to hold a cantilever arm of the tab.

4. A mounting structure for a vehicle accessory on a vehicle, the mounting structure comprising:
   a panel including a surface defining a channel with a wall disposed between two sides extending from the surface in a direction toward an interior of the vehicle, the wall defining a ledge; and
   a tab, attached with the vehicle accessory that mates with the channel, the tab being confined by the sides and the ledge between the surface and the wall such that the vehicle accessory is slideably and removably attached to the panel, wherein the surface further defines a recessed bore defined at an angle toward a floor of the vehicle such that light from an ambient light engine projects through the bore.

5. The mounting structure of claim 1 further comprising electrical pads molded on the surface and within the channel to interconnect the vehicle accessory and a vehicle control sub-system.

6. The mounting structure of claim 1 further comprising a port formed in the channel beneath the ledge on a bottom surface of the channel.

7. A storage system for an interior of a vehicle, the storage system comprising:
   a mounting structure for a vehicle panel, the mounting structure including a channel defined on the panel having a wall disposed between two sides extending from a surface in a direction toward an interior of the vehicle, the wall defining a ledge;
   an accessory having a tab that mates with the channel, the tab being confined by the sides and the ledge between the surface and the wall such that the accessory is slideably and removably disposed within the channel; and
   electrical pads molded on the surface and within the channel to interconnect the accessory and a vehicle control sub-system.

8. The storage system of claim 7, wherein the tab includes a cantilever arm that interconnects the accessory and the tab, the cantilever arm being slidable within the channel.

9. The storage system of claim 7, wherein the wall defines first and second diameters along a length of the channel, the first diameter being greater than the second diameter.

10. The storage system of claim 9, wherein the wall defines the first and second diameters in a tapered orientation such that the ledge defines an apex to retain a cantilever arm of the tab.

11. The storage system of claim 7, wherein the surface further defines a recessed bore defined at an angle toward a floor of the vehicle such that light from an ambient light engine projects through the bore.

12. The storage system of claim 7 further comprising a port formed in the channel beneath the ledge on a bottom surface of the channel.

13. A vehicle comprising:
- a panel disposed in an interior area of the vehicle, the panel defining a channel having a wall disposed between two sides extending from a surface in a direction toward an interior of the vehicle, the wall defining a ledge;
- an accessory removably attached to the panel via a tab that mates with the channel, the tab being confined by the sides and the ledge between the surface and the wall such that the tab is slideably received within the channel; and
- a port formed in the channel beneath the ledge on a bottom surface of the channel.

14. The vehicle of claim 13, wherein the tab includes a cantilever arm that interconnects the accessory and the tab, the cantilever arm being slidable within the channel.

15. The vehicle of claim 14, wherein the wall defines first and second diameters in a tapered orientation such that the ledge defines an apex to retain the cantilever arm of the tab.

16. The vehicle of claim 13, wherein the surface further defines a recessed bore defined at an angle toward a floor of the vehicle such that light from an ambient light engine projects through the bore.

17. The vehicle of claim 13 further comprising electrical pads molded on the surface and within the channel to interconnect the accessory and a vehicle control sub-system.

\* \* \* \* \*